United States Patent
Gendron-Bellemare et al.

(10) Patent No.: US 11,727,264 B2
(45) Date of Patent: Aug. 15, 2023

(54) REINFORCEMENT LEARNING USING PSEUDO-COUNTS

(71) Applicant: DEEPMIND TECHNOLOGIES LIMITED, London (GB)

(72) Inventors: Marc Gendron-Bellemare, London (GB); Remi Munos, London (GB); Srinivasan Sriram, London (GB)

(73) Assignee: DeepMind Technologies Limited, London (GB)

( * ) Notice: Subject to any disclaimer, the term of this patent is extended or adjusted under 35 U.S.C. 154(b) by 1206 days.

(21) Appl. No.: 16/303,501

(22) PCT Filed: May 18, 2017

(86) PCT No.: PCT/US2017/033218
§ 371 (c)(1),
(2) Date: Nov. 20, 2018

(87) PCT Pub. No.: WO2017/201220
PCT Pub. Date: Nov. 23, 2017

(65) Prior Publication Data
US 2020/0327405 A1    Oct. 15, 2020

Related U.S. Application Data

(60) Provisional application No. 62/339,778, filed on May 20, 2016.

(51) Int. Cl.
*G06N 3/08* (2023.01)
*G06F 17/18* (2006.01)
*G06N 3/047* (2023.01)

(52) U.S. Cl.
CPC .............. *G06N 3/08* (2013.01); *G06F 17/18* (2013.01); *G06N 3/047* (2023.01)

(58) Field of Classification Search
CPC ......... G06N 3/08; G06N 3/0472; G06F 17/18
See application file for complete search history.

(56) References Cited

U.S. PATENT DOCUMENTS 9,446,515 B1 *   9/2016   Meier ................ G01N 33/0016
2015/0100530 A1 *  4/2015   Mnih ...................... A63F 13/67
                                                                706/25

OTHER PUBLICATIONS

Abel et al. "Exploratory Gradient Boosting for reinforcement learning in complex domains," arXiv 1603.04119v1, Mar. 14, 2016, 8 pages.

(Continued)

*Primary Examiner* — Ying Yu Chen
(74) *Attorney, Agent, or Firm* — Fish & Richardson P.C.

(57) ABSTRACT

Methods, systems, and apparatus, including computer programs encoded on computer storage media, for training a neural network used to select actions to be performed by an agent interacting with an environment. One of the methods includes obtaining data identifying (i) a first observation characterizing a first state of the environment, (ii) an action performed by the agent in response to the first observation, and (iii) an actual reward received resulting from the agent performing the action in response to the first observation; determining a pseudo-count for the first observation; determining an exploration reward bonus that incentivizes the agent to explore the environment from the pseudo-count for the first observation; generating a combined reward from the actual reward and the exploration reward bonus; and adjusting current values of the parameters of the neural network using the combined reward.

20 Claims, 3 Drawing Sheets

(56) References Cited

OTHER PUBLICATIONS

Bellemare et al. "The Arcade Learning Environment: An evalution platform for general agents," Journal of Artificial Intelligence Research, Jun. 2013, 5 pages.
Bellemare et al. "Skip context tree switching," Proceedings of the 31$^{st}$ International Conference on Machine Learning, Jan. 2013, 9 pages.
Bellmare et al. "Increasing the action gap: New operators for reinforcement learning," Proceedings of the 30$^{th}$ AAAI Conference on Artificial Intelligence, Feb. 2016, 8 pages.
Bureau et al. "Bellmanian bandit network," Proceedings of NIPS '27 Workshop on Autonomously Learning Robots, Dec. 12, 2014, 6 pages.
Hasselt et al. "Deep reinforcement learning with double Q-learning," arXiv 1509.06461v3, Dec. 8, 2015, 13 pages.
Houtfooft et al. "VIME: Variational information maximizing exploration," NIPS Dec. 2016, 9 pages.
Hutter et al. "Sparse adaptive dirichlet-multinomial-like processes," Proceedings of the Conference on Online Learning Theory, Jun. 2013, 28 pages.
Kolter et al. "Near-Bayesian exploration in polynominal time," Proceedings of the 26$^{th}$ International Conference on Machine Learning, Jun. 2009, 10 pages.
Leike et al "Thompson sampling is asymptotically optimal in general environments," Proceedings of the Conference on uncertainty in Artificial Intelligence, Jun. 2016, 10 pages.
Lopes et al. "Exploration in model-based reinforcement learning by empirically estimating learning progress (w/supplementary information)," Proceedings of the 26$^{th}$ Annual Conference on Neural Information Processing Systems, Dec. 2012, 10 pages.
Machado et al. "Domain-independent optimistic initialization for reinforcement learning," AAAI Workshop: Learning for General Competency in Video Games, Apr. 2015, 3 pages.
Mnih et al. "Asynchronous methods for deep reinforcement learning," International Conference on Machine Learning, Jun. 2016, 10 pages.
Mnih et al. "Human-level control through deep reinforcement learning," Nature 518, Feb. 2015, 13 pages.
Mohamed et al. "Variational information maximisation for intrinsically motivated reinforcement learning," NIPS, Dec. 2015, 9 pages.
Ollivier et al. "Laplace's rule of succession in information geometry," arXiv 1503.04304v1, Mar. 14, 2015, 10 pages.
Orseau et al. "Universal knowledge-seeking agents for stochastic environments," Proceedings of the Conference on Algorithmic Learning Theory, Oct. 6, 2013, 15 pages.
Oudeyer et al. "Intrinsic motivation systems for autonomous mental development," IEEE Transaction on Evolutional Computation, 11(2), Apr. 2007, 22 pages.
Pazis et al. "Efficient Pac-Optimal exploration in concurrent, continuous state MDPs with delated updates," Proceedings of the 30$^{th}$ AAAI Conference on Artificial Intelligence, Feb. 12, 2016, 9 pages.
PCT International Preliminary Report on Patentability issued in International Application No. PCT/US2017/033218, dated Oct. 15, 2018, 16 pages.
PCT International Search Report and Written Opinion issued in International Application No. PCT/US2017/033218, dated Aug. 16, 2017, 15 pages.
PCT Written Opinion issued in International Application No. PCT/US2017/033218, dated Apr. 26, 2018, 9 pages.
Schmidhuber et al. "A possibility for implementing curiosity and boredom in model-building neural controllers," From animals to animats: proceedings of the first international conference on simulation of adaptive behavior, Feb. 1991, 7 pages.
Sequeira et al. "Emotion-based intrinsic motivation for reinforcement learning agents," Lecture Notes in Computer Science, vol. 6974, Oct. 9, 2011, 11 pages.
Singh et al. "Intrinsically motivated reinforcement learning," NIPS, Dec. 2004, 8 pages.
Stadie et al. "Incentivizing exploration in reinforcement learning with deep predictive models," arXiv 1507.00814v3, Nov. 19, 2015, 11 pages.
Stehl et al. "An analysis of model-based interval estimation for Markov decision processes," Journal of Computer and System Science, 74(8), Dec. 2008, 23 pages.
Van den Oord et al. "Pixel recurrent neural networks," Proceedings of the 33$^{rd}$ International Conference on Machine Learning, arXiv 1601.06759v3, Aug. 19, 2016, 11 pages.
Van Hasselt et al. "Deep reinforcement learning with double Q-learning," AAAI vol. 2, Feb. 12, 2016, 7 pages.
Veness et al. "Compress and control," AAAI, Jan. 25, 2015, 8 pages.
Wainwright et al. "Graphical models, exponential families, and Variational inference," Foundations and Trends in Machine Learning, 1(1), Nov. 18, 2008, 31 pages.

* cited by examiner

REINFORCEMENT LEARNING USING PSEUDO-COUNTS

CROSS REFERENCE TO RELATED APPLICATIONS

This application is a National Stage Application under 35 U.S.C. § 371 and claims the benefit of International Application No. PCT/US2017/033218, filed May 18, 2017, which is a non-provisional of and claims priority to U.S. Provisional Patent Application No. 62/339,778, filed on May 20, 2016, the entire contents of which are hereby incorporated by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system implemented as computer programs on one or more computers in one or more locations can adjust the parameters of a neural network used to select actions to be performed by an agent interacting with an environment in response to received observations.

According to a first aspect there is provided a method for training a neural network used to select actions to be performed by an agent interacting with an environment. The method comprising obtaining data identifying (i) a first observation characterizing a first state of the environment, (ii) an action performed by the agent in response to the first observation, and (iii) an actual reward received resulting from the agent performing the action in response to the first observation. The method further comprises determining a pseudo-count for the first observation, determining an exploration reward bonus that incentivizes the agent to explore the environment from the pseudo-count for the first observation, generating a combined reward from the actual reward and the exploration reward bonus, and adjusting current values of the parameters of the neural network using the combined reward.

In an implementation, the pseudo-count is an estimated measure of certainty of the effects of taking actions in response to the first observation.

In an implementation, adjusting the current values of the parameters comprises using the combined reward in place of the actual reward in performing an iteration of a reinforcement learning technique.

In an implementation, the reinforcement learning technique is a Double DQN technique with a mixed in Monte Carlo return.

In an implementation, the reinforcement learning technique is an actor-critic technique.

In an implementation, generating the combined reward comprises summing the actual reward and the exploration reward bonus.

In an implementation, the exploration reward bonus RB satisfies:

$$RB = \frac{\beta}{\left(\hat{N}(x) + a\right)^b},$$

wherein x is the first observation, $\hat{N}(x)$ is the pseudo-count for the first observation, a and b are constants, and $\beta$ is a parameter selected by a parameter sweep.

In an implementation, the pseudo-count $\hat{N}(x)$ for the first observation is of the form:

$$\hat{N}_n(x) = \frac{\rho_n(x)(1 - \rho'_n(x))}{\rho'_n(x) - \rho_n(x)},$$

wherein $\rho_n(x)$ is the value of a sequential density model for the first observation and $\rho_n'(x)$ is the recoding probability for the first observation.

In an implementation, the recoding probability is a value of the sequential density model after observing a new occurrence of the first observation.

In an implementation, the sequential density model is a pixel-level density model.

According to a second aspect, there is provided a system comprising one or more computers and one or more storage devices storing instructions that are operable, when executed by the one or more computers, to cause the one or more computers to perform the operations of a method according to the first aspect.

According to a third aspect, there is provided computer storage medium encoded with instructions that, when executed by one or more computers, cause the one or more computers to perform the operations of a method according to the first aspect.

The subject matter described in this specification can be implemented in particular implementations so as to realize one or more of the following advantages. The reinforcement learning system can effectively select actions to be performed by an agent in an action space in order to complete a task, i.e., by using a neural network that is trained using a pseudo-count method. The action space may be a real world environment with which the agent can interact. In particular, the system combines bonus rewards, which are inversely proportional to pseudo-counts derived from a sequential density model, with actual rewards that resulted from the agent performing actions to generate combined rewards. The system then uses the combined rewards to train the neural network to select actions to be performed by the agent. Being trained in this manner, the neural network can incentivize the agent to explore an environment more thoroughly (e.g., encouraging the agent to explore observations that have not been observed frequently), thus improving exploration results while requiring a smaller number of training iterations. By training the neural network using pseudo-counts, the system can reduce computational time and resources required to select actions for the agent to explore the environment.

The method has an advantage that an agent such as a robot, or autonomous or semi-autonomous vehicle can improve its interaction with a real-world environment. It can enable for example the accomplishment of a specific task or improvement of navigation through or observation of the environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that selects actions to be performed by a reinforcement learning agent interacting with an environment by using a neural network. In order to interact with the environment, the agent receives data characterizing the current state of the environment and performs an action from an action space, i.e., a discrete action space or continuous action space, in response to the received data. Data characterizing a state of the environment will be referred to in this specification as an observation.

In some implementations, the environment is a real-world environment and the agent is a mechanical agent interacting with the real-world environment. For example, the agent may be a robot interacting with the environment to accomplish a specific task. As another example, the agent may be an autonomous or semi-autonomous vehicle navigating through the environment. In these cases, the observation can be data captured by one or more sensors of the mechanical agent as it interacts with the environment, e.g., a camera, a LIDAR sensor, a temperature sensor, and so on.

In other implementations, the environment is a simulated environment and the agent is implemented as one or more computers interacting with the simulated environment. For example, the simulated environment may be a video game and the agent may be a simulated user playing the video game.

Figure 1:
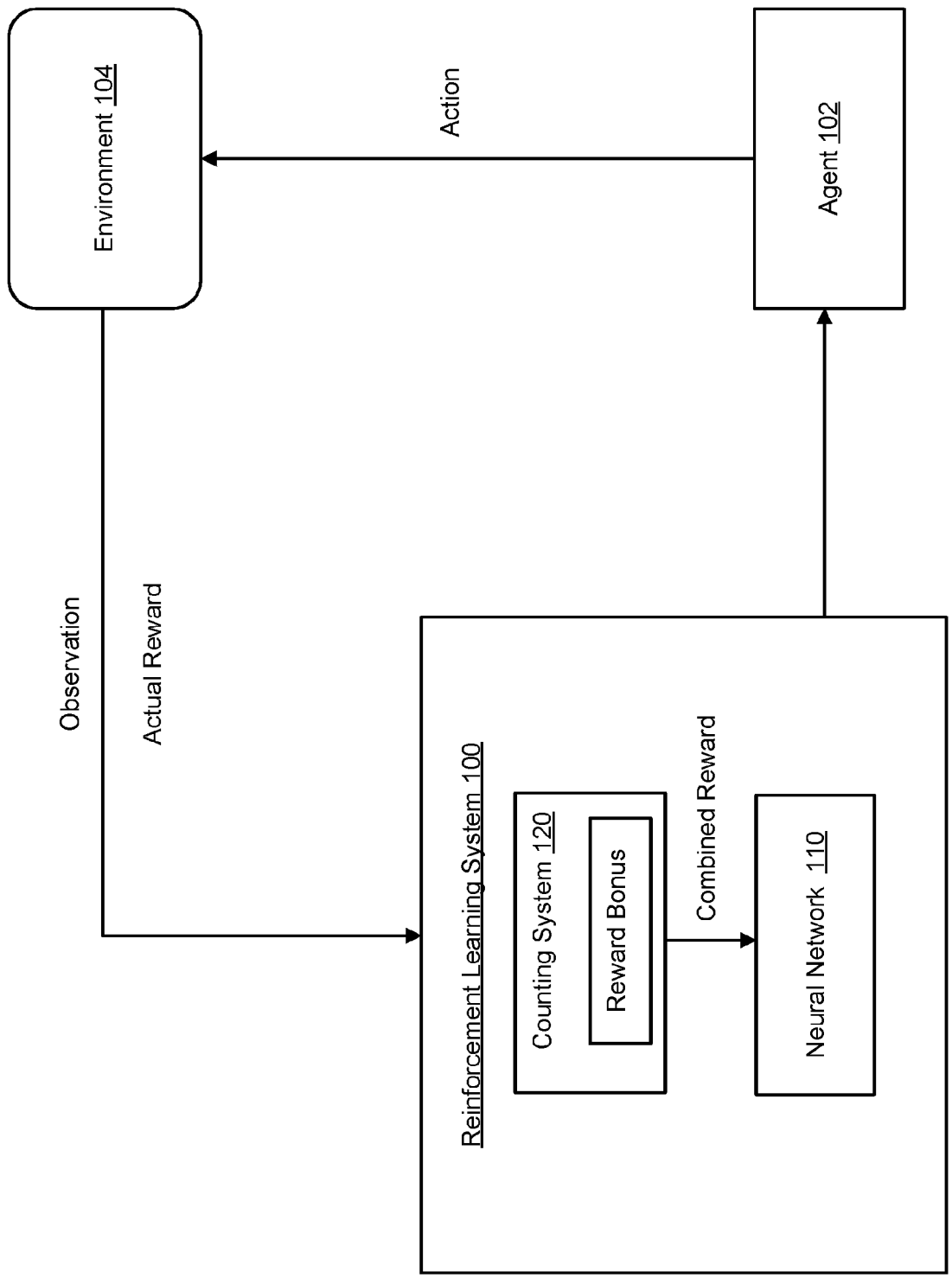
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102 interacting with an environment 104. That is, the reinforcement learning system 100 receives observations, with each observation characterizing a respective state of the environment 104, and, in response to each observation, selects an action from an action space to be performed by the reinforcement learning agent 102 in response to the observation and then instructs or otherwise causes the agent 102 to perform the selected action. After the agent 102 performs a selected action, the environment 104 transitions to a new state and the system 100 receives another observation characterizing the next state of the environment 104 and a reward. The reward can be a numeric value that is received by the system 100 or the agent 102 from the environment 104 as a result of the agent 102 performing the selected action. That is, the reward received by the system 100 generally varies depending on the result of the transition of states caused by the agent 102 performing the selected action. For example, a transition into a state that is closer to completing the task being performed by the agent 102 may result in a higher reward being received by the system 100 than a transition into a state that is farther from completing the task being performed by the agent 102.

In particular, to select an action, the reinforcement learning system 100 includes a neural network 110. Generally, the neural network 110 is a neural network that is configured to receive an observation and to process the observation to generate an output that defines the action that should be performed by the agent in response to the observation.

In some implementations, the neural network 110 is a neural network that receives an observation and an action and outputs a probability that represents a probability that the action is the one that maximizes the chances of the agent completing the task.

In some implementations, the neural network 110 is a neural network that receives an observation and generates an output that defines a probability distribution over possible actions, with the probability for each action being the probability that the action is the one that maximizes the chances of the agent completing the task.

In some other implementations, the neural network 110 is a neural network that is configured to receive an observation and an action performed by the agent in response to the observation, i.e., an observation-action pair, and to generate a Q-value for the observation-action pair that represents an estimated return resulting from the agent performing the action in response the observation in the observation-action pair. The neural network 110 can repeatedly perform the process, e.g. by repeatedly generating Q-values for observation-action pairs. The system 100 can then use the generated Q-values to determine an action for the agent to perform in response to a given observation.

To allow the agent 102 to effectively interact with the environment, the reinforcement learning system 100 trains the neural network 110 to determine trained values of the parameters of the neural network 110 by using combined rewards generated by a counting system 120. In particular, during training, the counting system 120 maintains a sequence of observations that the system 100 has previously received.

After the agent 102 performed an action in response to a given observation and an actual reward was received by the system 100 as a result of the agent performing the action, the counting system receives data identifying the given observation, the action, and the actual reward. Based on the data, the counting system 120 determines a pseudo-count for the given observation using a sequential density model. The counting system 120 then determines an exploration reward bonus that incentivizes the agent to explore the environment from the determined pseudo-count for the given observation. Subsequently, the counting system 120 determines a combined reward from the actual reward and the exploration reward bonus.

The reinforcement learning system 100 then uses the combined reward to train the neural network 110. Training the neural network 110 is described in more detail below with reference to FIG. 2. Determining the pseudo-count, exploration reward bonus, and combined reward for a given observation is described in more detail below with reference to FIG. 3.

Figure 2:
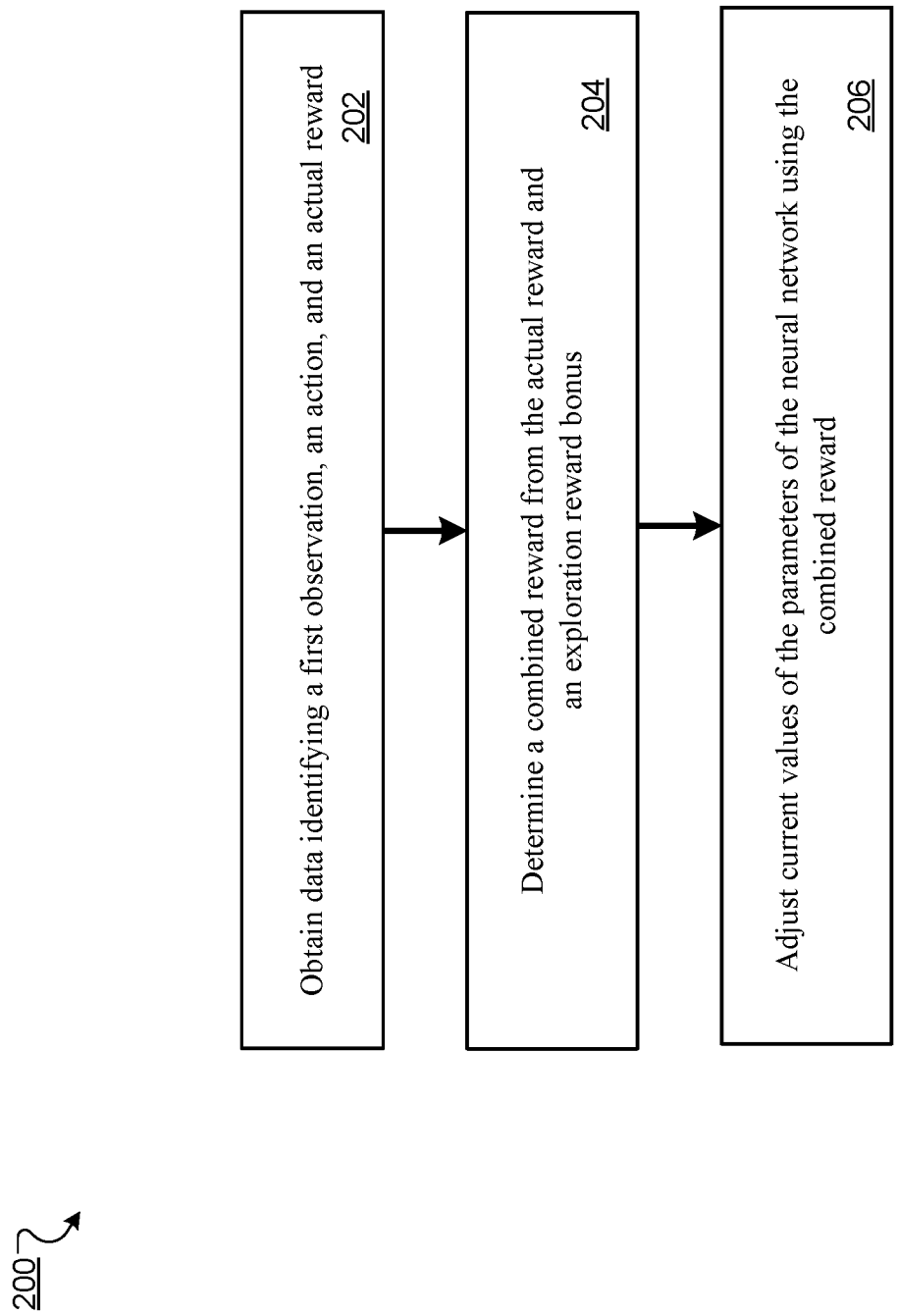
FIG. 2 is a flow diagram of an example process for training a neural network used to select actions to be performed by an agent interacting with an environment.

FIG. 2 is a flow diagram of an example process for training a neural network used to select actions to be performed by an agent interacting with an environment. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200.

The system obtains data identifying (i) a first observation characterizing a first state of the environment, (ii) a first action performed by the agent in response to the first observation, and (iii) an actual reward received resulting from the agent performing the action in response to the first observation (step 202). Generally, the actual reward is a numeric value that depends on how the environment changed in response to the agent performing the first action. In some implementations, e.g., in implementations where the neural network is being trained using an off-policy algorithm, the system can obtain the data from a memory that stores experience tuples, i.e., observation-action-reward tuples, generated from the agent interacting with the environment. In other implementations, e.g., in implementations whether the neural network is being trained using an on-policy algorithm, the obtained data has been generated as a result of a most-recent interaction of the agent with the environment.

Next, the system determines a combined reward corresponding to the first observation from the actual reward and an exploration reward bonus (step 204). An exploration reward bonus can be used to incentivize the agent to explore the environment. For example, the exploration reward bonus can be used to encourage the agent to explore new parts of the environment by receiving new observations that have not been observed before. Determining an exploration reward bonus is described in more detail below with reference to FIG. 3.

The system then adjusts current values of the parameters of the neural network using the combined reward (step 206). Generally, the system adjusts the current values of the parameters of the neural network such that the neural network selects actions that that maximize the expected sum of combined rewards. That is, the system can adjust the current values of parameters of the neural network such that the neural network selects actions that (i) result in the environment transitioning into states that are closer to completing the task, which yield higher actual rewards being received by the system, and/or that (ii) encourage the agent to explore observations that have not been observed frequently or never been observed before to maximize the received exploration reward bonuses.

Adjusting the current values of the parameters includes using the combined reward in place of the actual reward in performing an iteration of a reinforcement learning technique. The system can use any appropriate reinforcement learning technique, i.e., a reinforcement learning technique that is appropriate for training neural networks that generate the kinds of outputs that the neural network is configured to generate. For example, in some implementations, the reinforcement learning technique is a Double DQN technique with a mixed in Monte Carlo return. In some other implementations, the reinforcement learning technique is an actor-critic technique. In some of these reinforcement learning techniques, the system also obtains additional information, e.g., the next observation received after the agent performs the first action, required to perform the iteration of the technique and then performs the reinforcement learning technique using the first observation, the first action, the combined reward, and the additional information.

Figure 3:
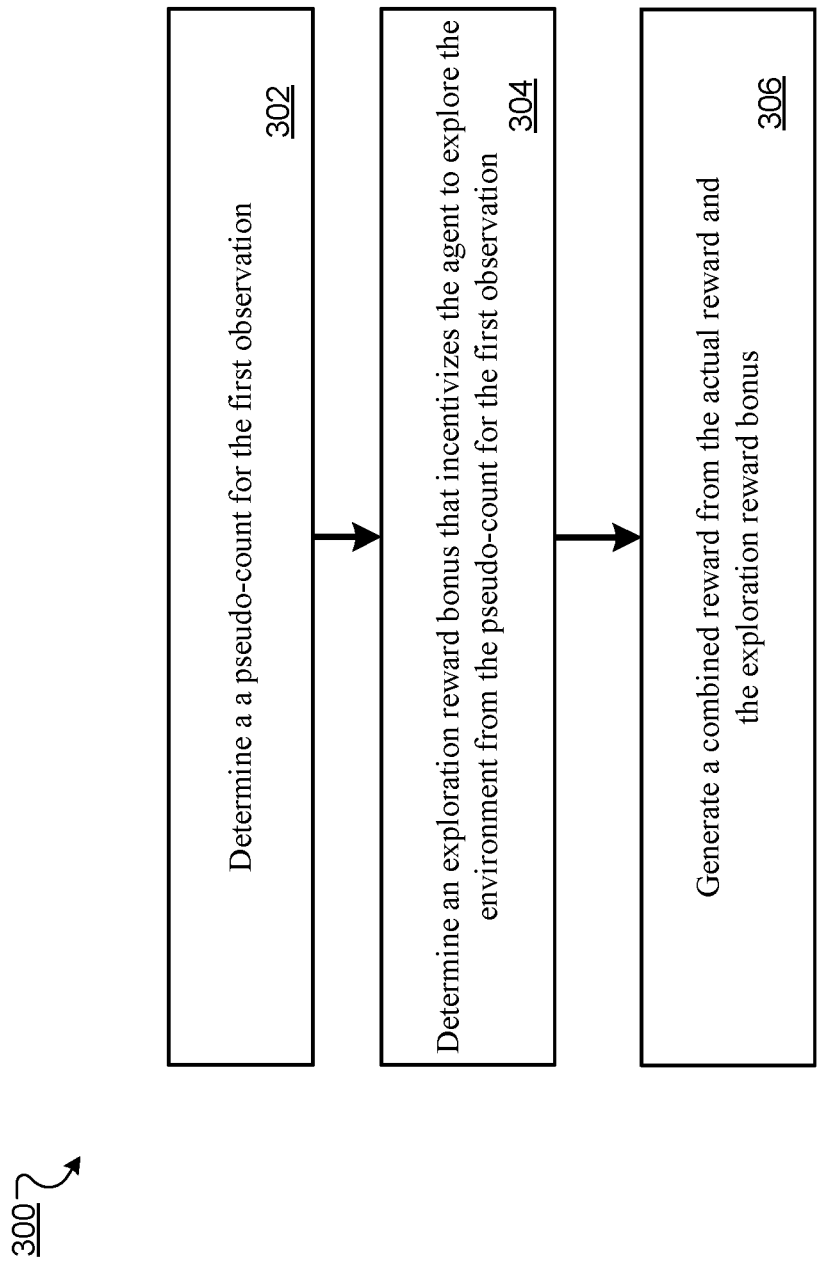
FIG. 3 is a flow diagram of an example process for generating a combined reward.

FIG. 3 is a flow diagram of an example process for generating a combined reward. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system determines a pseudo-count for the first observation (step 302). The pseudo-count is an estimated measure of how certain the system is about what the effects of taking actions in response to the first observation will be. Specifically, the pseudo-count for the first observation is an empirical count function that depends on a number of occurrences of the first observation during the training of the neural network. The pseudo-count $\hat{N}(x)$ for the first observation x can be determined as follows:

$$\hat{N}_n(x) = \frac{\rho_n(x)(1 - \rho'_n(x))}{\rho'_n(x) - \rho_n(x)},$$

wherein $\rho_n(x)$ is the value of a sequential density model for the first observation and $\rho_n'(x)$ is the recoding probability for the first observation x.

The sequential density model represents a likelihood that the first observation x occurs given n previous observations $X_1, \ldots, X_n$ as follows:

$$\rho_n(x) := \rho(x; x_{1:n}) = Pr_\rho(X_{n+1} = x | X_1 \ldots X_n = x_{1:n}),$$

wherein $Pr_\rho(X_{n+1}=x | X_1 \ldots X_n = x_{1:n})$ is a conditional probability representing a likelihood that the n+1$^{th}$ observation $X_{n+1}$ is the same as the first observation x given that n previous observations $X_1, \ldots, X_n$ have been received.

The sequential density model can be, for example, a pixel-level density model. Pixel-level density models are described in more detail in Bellemare, M., Veness, J., and Talvitie, E. (2014). "Skip context tree switching." In Proceedings of the 31st International Conference on Machine Learning, pages 1458-1466

The recoding probability is a value of the sequential density model for the first observation x after observing a new occurrence of the first observation:

$$\rho_n'(x) := \rho(x; x_{1:n}x).$$

The recoding probability can be determined as follows:

$$\rho_n'(x) = Pr_\rho(X_{n+2} = x | X_1 \ldots X_n = x_{1:n}, X_{n+1} = x).$$

wherein $Pr_\rho(X_{n+2}=x | X_1 \ldots X_n = x_{1:n}, X_{n+1}=x)$ is a conditional probability representing a likelihood that the new observation, e.g., the n+2$^{th}$ observation $X_{n+2}$ following the n+1$^{th}$ observation $X_{n+1}$ (which is the same as the first observation as noted above), is the same as the first observation x given that n+1 previous observations $x_{1:n}$ and x have occurred.

The system then determines an exploration reward bonus that incentivizes the agent to explore the environment from the pseudo-count for the first observation x (step 302). Generally, the exploration reward bonus is inversely proportional to the pseudo-count $\hat{N}(x)$. That means when the pseudo-count $\hat{N}(x)$ becomes larger, i.e., the first observation x has occurred more frequently, the exploration reward bonus corresponding to the first observation becomes smaller, and vice versa. In some implementations, the exploration reward bonus RB can be determined as follows:

$$RB = \frac{\beta}{\left(\hat{N}(x) + a\right)^b},$$

wherein x is the first observation, $\hat{N}(x)$ is the pseudo-count for the first observation, a and b are constants, and $\beta$ is a parameter selected by a parameter sweep. The two constants a and b are generally positive constants.

The system then generates a combined reward corresponding to the first observation from the actual reward and the exploration reward bonus (step 304). For example, the system generates the combined reward by summing the actual reward and the exploration reward bonus.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method for training a neural network used to select actions to be performed by an agent interacting with an environment, the computer-implemented method comprising:
   obtaining data identifying a first observation characterizing a first state of the environment;
   selecting, using the neural network, an action to be performed by the agent in response to the first observation;
   controlling the agent to perform the selected action;
   receiving an actual reward resulting from the agent performing the action in response to the first observation;
   determining a pseudo-count for the first observation using a sequential density model which represents a likelihood that the first observation occurs given a sequence of previous observations, wherein the pseudo-count depends upon a number of previous occurrences of the first observation during the training of the neural network;
   determining an exploration reward bonus that incentivizes the agent to explore the environment from the pseudo-count for the first observation, wherein the exploration reward bonus is lower when the pseudo-count is higher and vice-versa;
   generating a combined reward from the actual reward and the exploration reward bonus; and
   training the neural network by adjusting current values of parameters of the neural network using the combined reward.

2. The computer-implemented method of claim 1, wherein adjusting the current values of the parameters comprises:
   using the combined reward in place of the actual reward in performing an iteration of a reinforcement learning technique.

3. The computer-implemented method of claim 1, wherein the neural network is configured to receive the first observation and generates an output that defines a probability distribution over possible actions, with a probability for each action being a probability that the action maximizes chances of the agent completing a task performed by the agent.

4. The computer-implemented method of claim 1, wherein the neural network is configured to receive an observation-action pair which is the first observation and an action performed by the agent in response to the first observation, and to generate a Q-value for the observation-action pair that represents an estimated return resulting from the agent performing the action in response the observation in the observation-action pair.

5. The computer-implemented method of claim 1, wherein generating the combined reward comprises summing the actual reward and the exploration reward bonus.

6. The computer-implemented method of claim 1, wherein the exploration reward bonus RB satisfies:

$$RB = \frac{\beta}{(\hat{N}(x) + a)^b},$$

wherein x is the first observation, $\hat{N}(x)$ is the pseudo-count for the first observation, a and b are constants, and $\beta$ is a parameter selected by a parameter sweep.

7. The computer-implemented method of claim 1, wherein the pseudo-count $\hat{N}(x)$ for the first observation is of the following form:

$$\hat{N}_n(x) = \frac{\rho_n(x)(1 - \rho'_n(x))}{\rho'_n(x) - \rho_n(x)},$$

wherein $\rho_n(x)$ is a value of a sequential density model for the first observation and $\rho_n'(x)$ is a recoding probability for the first observation, wherein the recoding probability is a value of the sequential density model after observing a new occurrence of the first observation.

8. The computer-implemented method of claim 1, wherein the sequential density model is a pixel-level density model.

9. The computer-implemented method of claim 1, wherein the agent is a mechanical agent and the environment is a real-world environment, and wherein the neural network is trained as the agent explores the environment.

10. One or more non-transitory computer storage media encoded with instructions that, when executed by one or more computers, cause the one or more computers to perform operations for training a neural network used to select actions to be performed by an agent interacting with an environment, the operations comprising:
obtaining data identifying a first observation characterizing a first state of the environment;
selecting, using the neural network, an action to be performed by the agent in response to the first observation;
controlling the agent to perform the selected action;
receiving an actual reward resulting from the agent performing the action in response to the first observation;
determining a pseudo-count for the first observation using a sequential density model which represents a likelihood that the first observation occurs given a sequence of previous observations, wherein the pseudo-count depends upon a number of previous occurrences of the first observation during the training of the neural network;
determining an exploration reward bonus that incentivizes the agent to explore the environment from the pseudo-count for the first observation, wherein the exploration reward bonus is lower when the pseudo-count is higher and vice-versa;
generating a combined reward from the actual reward and the exploration reward bonus; and
training the neural network by adjusting current values of parameters of the neural network using the combined reward.

11. The one or more non-transitory computer storage media of claim 10, wherein the exploration reward bonus RB satisfies:

$$RB = \frac{\beta}{(\hat{N}(x) + a)^b},$$

wherein x is the first observation, $\hat{N}(x)$ is the pseudo-count for the first observation, a and b are constants, and $\beta$ is a parameter selected by a parameter sweep.

12. A system comprising one or more computers and one or more non-transitory computer storage media encoded with instructions that, when executed by the one or more computers, cause the one or more computers to perform operations for training a neural network used to select actions to be performed by an agent interacting with an environment, the operations comprising:
obtaining data identifying a first observation characterizing a first state of the environment;
selecting, using the neural network, an action to be performed by the agent in response to the first observation;
controlling the agent to perform the selected action;
receiving an actual reward resulting from the agent performing the action in response to the first observation;
determining a pseudo-count for the first observation using a sequential density model which represents a likelihood that the first observation occurs given a sequence of previous observations, wherein the pseudo-count depends upon a number of previous occurrences of the first observation during the training of the neural network;
determining an exploration reward bonus that incentivizes the agent to explore the environment from the pseudo-count for the first observation, wherein the exploration reward bonus is lower when the pseudo-count is higher and vice-versa;
generating a combined reward from the actual reward and the exploration reward bonus; and
training the neural network by adjusting current values of parameters of the neural network using the combined reward.

13. The system of claim 12, wherein adjusting the current values of the parameters comprises:
using the combined reward in place of the actual reward in performing an iteration of a reinforcement learning technique.

14. The system of claim 12, wherein the neural network is configured to receive the first observation and generates an output that defines a probability distribution over possible actions, with a probability for each action being a probability that the action maximizes chances of the agent completing a task performed by the agent.

15. The system of claim 12, wherein the neural network is configured to receive an observation-action pair which is the first observation and an action performed by the agent in response to the first observation, and to generate a Q-value for the observation-action pair that represents an estimated return resulting from the agent performing the action in response the observation in the observation-action pair.

16. The system of claim 12, wherein generating the combined reward comprises summing the actual reward and the exploration reward bonus.

17. The system of claim 12, wherein the exploration reward bonus RB satisfies:

$$RB = \frac{\beta}{(\hat{N}(x) + a)^b},$$

wherein x is the first observation, $\hat{N}(x)$ is the pseudo-count for the first observation, a and b are constants, and $\beta$ is a parameter selected by a parameter sweep.

18. The system of claim 12, wherein the pseudo-count $\hat{N}(x)$ for the first observation is of the following form:

$$\hat{N}_n(x) = \frac{\rho_n(x)(1 - \rho'_n(x))}{\rho'_n(x) - \rho_n(x)},$$

wherein $\rho_n(x)$ is a value of a sequential density model for the first observation and $\rho_n'(x)$ is a recoding probability for the first observation, wherein the recoding probability is a value of the sequential density model after observing a new occurrence of the first observation.

19. The system of claim 12, wherein the sequential density model is a pixel-level density model.

20. The system of claim 12, wherein the agent is a mechanical agent and the environment is a real-world environment, and wherein the neural network is trained as the agent explores the environment.

* * * * *